United States Patent [19]

Abrams et al.

[11] Patent Number: 5,395,456
[45] Date of Patent: Mar. 7, 1995

[54] ABRASIVE AND PURGE COMPOSITIONS AND METHODS OF USING THE SAME

[75] Inventors: Richard L. Abrams, North Royalton; Robert J. Opalko, Middleburg Hts., both of Ohio

[73] Assignee: Ferro Corporation, Cleveland, Ohio

[21] Appl. No.: 58,492

[22] Filed: May 6, 1993

[51] Int. Cl.$^6$ .............................................. B08B 9/00
[52] U.S. Cl. .............................. 134/22.14; 134/22.11; 134/22.12; 134/42; 252/163; 252/174.23; 252/174.14
[58] Field of Search ................... 134/6, 8, 22.1, 22.4, 134/22.12, 22.14, 42; 252/89.1, 108, 116, 162, 163, 174.23, 174.14

[56] References Cited

U.S. PATENT DOCUMENTS

| | | | |
|---|---|---|---|
| 4,188,236 | 2/1980 | Robertson et al. | 106/308 Q |
| 4,571,416 | 2/1986 | Jarzombek et al. | 524/474 |
| 4,634,471 | 1/1987 | Foye et al. | 106/262 |
| 4,838,945 | 6/1989 | Fujii et al. | 134/7 |
| 4,910,236 | 3/1990 | Foye et al. | 523/333 |
| 5,157,067 | 10/1992 | Burditt et al. | 524/270 |
| 5,236,514 | 8/1993 | Leung et al. | 134/22.14 |
| 5,298,078 | 3/1994 | Ioh et al. | 134/9 |

*Primary Examiner*—Asok Pal
*Assistant Examiner*—P. Achutamurthy
*Attorney, Agent, or Firm*—Rankin, Hill, Lewis & Clark

[57] ABSTRACT

This invention relates to abrasive compositions useful in preparing purge compositions for purging plastics processing equipment comprising: (A-1) at least one abrasive powder comprising a major amount of calcium carbonate; (A-2) at least one organic rosin material; and (A-3) at least one surfactant. The abrasive compositions of the present invention further may comprise at least one viscosity reducing organic diluent. The purging compositions of the present invention comprise (A) a minor amount of the abrasive composition of the invention, and (B) a major amount of at least one polymer or resin. These purging compositions allow fast and effective purging of processing equipment. These compositions may also be reused, i.e., used for more than one purging operation, and they may be recycled by incorporating the used purge composition into a polymer which is identical to or compatible with the polymer (B) of the purge composition. The invention also relates to a method of purging plastics processing equipment utilizing the purging compositions described herein.

5 Claims, No Drawings

ABRASIVE AND PURGE COMPOSITIONS AND METHODS OF USING THE SAME

FIELD OF THE INVENTION

This invention relates to abrasive and purge compositions and to methods for using the same.

BACKGROUND OF THE INVENTION

Purge compositions are used in plastics processing equipment such as extrusion and injection molding equipment as a cleaning agent when the material which is being processed in the equipment is changed. For instance, in processing equipment, a change in the color of materials being processed requires removal of the material containing the first color before introduction of a material containing a second color. The purging compositions clean (remove) the first color from the system before introduction of the second color.

In some instances, the purging compositions should have sufficient viscosity to remove a material while not intermixing with that material. By not intermixing, the purging compositions can push the undesired materials out of the system.

U.S. Pat. No. 4,188,236 describes a process for producing non-dusting pigment compositions by contacting an aqueous dispersion of an organic pigment with a solution or dispersion of an alkaline-soluble rosin acid derivative, a sorbitan ester and a water-insoluble organic carder having a melting point below 100° C. The pigment compositions can be used for coloring plastics, inks, paints, etc.

U.S. Pat. No. 5,157,067 describes liquid concentrates for incorporation into polymeric resins which comprise (1) a vehicle, preferably substantially free of water, comprising at least one organic rosin material and at least one surfactant, and (2) at least one colorant or additive. Optionally, the concentrates contain one or more organic diluents. The colorants may be organic or inorganic materials, and the additives include UV stabilizers or absorbers, antioxidants, fire retardants, blowing agents, antistats, lubricants, impact modifiers, mold release agents, filler/reinforcing materials (e.g., calcium carbonates) or mixtures thereof. A mixture comprising 70% of titanium dioxide, 13.5% of calcium carbonate, 10.5 % of a rosin material, 4.5 % of mineral oil, 0.9% of a suffactant and 0.6% of tinting pigments is described as an example of a liquid color concentrate which may be blended with a polymeric resin to color the resin.

SUMMARY OF THE INVENTION

This invention relates to abrasive compositions useful in preparing purge compositions for purging plastics processing equipment comprising: (A-1) at least one abrasive powder comprising a major amount of calcium carbonate; (A-2) at least one organic rosin material; and (A-3) at least one surfactant. The abrasive compositions of the present invention further may comprise at least one viscosity reducing organic diluent. The purging compositions of the present invention comprise (A) a minor amount of the abrasive composition of the invention, and (B) a major amount of at least one polymer or resin. These purging compositions allow fast and effective purging of processing equipment. These compositions may also be reused, i.e., used for more than one purging operation, and they may be recycled by incorporating the used purge composition into a polymer which is identical to or compatible with the polymer (B) of the purge composition. The invention also relates to a method of purging plastics processing equipment utilizing the purging compositions described herein.

DESCRIPTION OF THE PREFERRED EMBODIMENTS

The abrasive compositions of the present invention comprise (A-1) at least one abrasive powder comprising a major amount of calcium carbonate; (A-2) at least one organic rosin material; and (A-3) at least one surfactant. Optionally, the abrasive compositions also will contain (A-4) at least one viscosity-modifying organic diluent.

(A-1) Abrasive Powder

The abrasive powder (A-1) may be calcium carbonate or any powder mixture which provides scouring characteristics to the purge compositions provided the powder mixture comprises a major amount of calcium carbonate. Throughout this specification and the claims, the term "major amount" means more than 50% by weight such as, for example, 50.1%, 60%, 70%, etc. The term "minor amount" means less than 50% based on the total weight of the mixture. Of course, regardless of the number of components present, the total amount cannot exceed 100%. Generally, the abrasive powders which may be present with the calcium carbonate are powdered minerals and can include titanium dioxide, silica, alumina, mica, etc. In one embodiment, the abrasive powder comprises at least a major proportion of calcium carbonate or mixtures of calcium carbonates containing a distribution of fine, medium, and coarse particles to provide higher weight loadings. In another embodiment, the abrasive powder comprises a mixture of two or more calcium carbonates having different particle size distributions and at least one other powder such as titanium dioxide having an even smaller particle size distribution. For example, a useful abrasive powder mixture comprises a calcium carbonate having a mean particle diameter of eighty microns, a calcium carbonate having a mean particle size of one micron, and titanium dioxide having a mean average diameter of less than one micron. Examples of commercially available calcium carbonates useful in the present invention include Marblemite TM and Supermite ® available from ECC America, Inc., Sylacauga, Ala. Marblemite TM is a dry ground natural whim calcium carbonate containing a distribution of fine, medium and coarse particles, and having a mean particle diameter of about eighty microns. Three percent of the powder is retained on a forty mesh screen while 45% by weight of the powder passes through a two-hundred mesh screen. Supermite ® is an extra-fine ground natural calcium carbonate having a mean particle diameter of one micron.

The amount of abrasive powder included in the abrasive compositions of the present invention may be varied over a wide range depending upon the intended utility of the composition and the preferences of the user. Generally, the abrasive composition will contain at least 60% by weight of the abrasive powder. More often, the abrasive composition will contain at least about 75% by weight of the abrasive powder up to the maximum weight loading of the powder which is dependent upon the particle size distribution. Amounts of abrasive powder up to about 85% or even 90% by weight based on the weight of the abrasive composition can be achieved.

(A-2) Organic Rosin Material

The abrasive mixtures utilized in the present invention also contain at least one organic rosin material. The organic rosin materials are known in the art and are available from a variety of commercial sources. Such materials are based upon or derived from gum, wood and/or tall oil rosins which are mainly a mixture of fused-ring, monocarboxylic acids typified by levopimaric acid, abietic acid and isomers thereof having the empirical formula $C_{19}H_{29}COOH$. Other acids such as dihydroabietic acid ($C_{19}H_{31}COOH$) and dehydroabietic acid ($C_{19}H_{27}COOH$) may also be present in the rosin materials. The rosin materials also include non-polymeric derivatives of rosin acids such as esters, addition salts, hydrogenates, reduction products and the like. Suitable rosin materials generally have viscosity of 10 to about 500 poise at 25° C. and are either liquid at 25° C. or have a softening point (Hercules drop method) of from about 25° C. up to about 200° C. and, more often, from about 25° C. up to about 80° C. The organic rosin materials may have an acid number from 0 to about 180 and, more often, from about 5 to about 50.

Representative examples of rosin materials (A-2) include those based upon: esters derived from rosin, comprising primarily of pimaric-type acid esters and/or abietic acid esters, including lower alkyl esters such as methyl, ethyl, propyl, butyl, and the like, glycerol esters, pentaerythritol esters, triethylene glycol esters, phthalate esters, and the like, and their hydrogenates and/or reduction products. Specific examples of organic rosin materials available from Hercules include: Abalyn®, a methyl ester of wood rosin; Hercolyn D®, a partially hydrogenated methyl ester of wood rosin; Staybelite®, a partially hydrogenated (50%) wood rosin; Staybelite ester 10, a glycerol ester of Staybelite; Poly-Pale Resin, 90% abietic acid and/or pimaric type acids and/or isomers thereof; Hercofiex P100, a partially hydrogenated methyl ester of wood rosin; etc.

The amount of organic rosin material included in the abrasive composition (A) may range from about 1 to about 30% or 40% by weight, more often from about 5% to about 20% by weight based on the total weight of the abrasive composition.

(A-3) Surfactants

The abrasive compositions (A) of the present invention also include at least one surfactant/dispersant (A-3) capable of producing a dispersion or suspension of the abrasive powder and increasing the weight loading of the abrasive powder in the abrasive mixture. The surfactants/dispersants may be nonionic, cationic, anionic, or amphoteric in nature so long as abrasive compositions can be produced with high loadings of abrasive powder and the compositions are stable. These surfactants are known in the art, and many of these are described in MeCutcheon's "Volume 1: Emulsifiers and Detergents", 1992, North American Edition, published by McCutcheon's Division, MC Publishing Corp., Glen Rock, N.J., and in particular, pp. 263–274 which lists a number of nonionic anionic, nonionic and amphoteric surfactants is hereby incorporated by reference for the disclosure in this regard. The amount of the surfactant included in the abrasive compositions of the present invention may be varied within a range of from about 0.1% to about 10% or even 15% by weight based on the total weight of the abrasive composition. More often, the surfactants will be present in amounts of from about 0.1% to about 5% by weight based on the weight of the abrasive composition.

The surfactants (A-3) generally are selected based upon the particular abrasive powders utilized in the abrasive compositions because different abrasive powders have different surfactant demands. In general, a particular abrasive powder's surfactant demand is met at the point wherein a sharp viscosity change (i.e., a difference of at least 100 fold) occurs during preparation of the abrasive composition. For the purposes of the present invention, when more than about 20% by weight (based on the weight of abrasive composition) of surfactant is required to meet such a demand, the surfactant does not have suitable activity.

Suitable surfactants may be selected for inorganic abrasive powders using the following screening procedure:

(1) Dissolve about 1.5% by weight of the candidate surfactant in a mineral oil such as White Oil 7-NF;

(2) Add about 50% by weight of the desired abrasive powder under stirring until some signs of thixotropy appear;

(3) Place the dispersion in a mixer at about an impeller tip speed of 5000–6000 feet per minute for 2 to about 5 minutes and observe the viscosity;

(4) If the viscosity observed in (3) is lower than about 500 poise, additional powder, up to about 82% by weight of the total composition, may be added. If the resultant dispersion becomes thixotropic, the surfactant, although inadequate for high loadings, is adequate for low powder loadings. If the dispersion remains flowable, the surfactant will be suitable for high powder loadings;

(5) If the viscosity observed in (3) is thixotropic, the surfactant composition is adjusted up to about 5.0% by weight. If the thixotropy persists, the surfactant is considered unsuitable. If the thixotropy breaks, the surfactant will be suitable for low powder loadings.

(6) Successful surfactants are tested at lower levels (between about 0.5 to about 10 weight percent), using a 1:1 mixture of a rosin material (A-2) such as Hercorex 500 and mineral oil and up to about 80% by weight of the abrasive powder. Surfactant level is adjusted until a suitable dispersion having the lowest amount of surfactant is found.

One class of surfactants (A-3) useful in the practice of the present invention includes those based upon polyesters of hydroxy carboxylic acids of the general formula HO—R—COOH where R is a divalent hydrocarbon group having at least about 8 carbon atoms; and polyesters prepared from mixtures of such hydroxy carboxylic acids with a carboxylic acid that is free from hydroxy groups. Representative examples of such hydroxy carboxylic acids include ricinoleic acid, mixtures of 9- and 10-hydroxystearic acid and 12-hydroxystearic acid (HSA). Representative examples of carboxylic acids that are free of hydroxy groups are lauric acid, palmitic acid, stearic acid and oleic acid. Mixtures of 9- and 10-hydroxystearic acid can be obtained by sulfonation of oleic acid followed by hydrolysis. Sources for 12-hydroxystearic acid include commercially available hydrogenated castor oil fatty acid which contains minor amounts of stearic acid and palmitic acid. Representative examples of suitable polyester surfactants include:

1. Poly-(12-hydroxystearic acid) surfactants of the structure

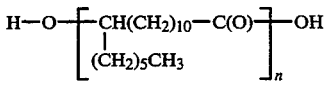

wherein n represents the degree of polymerization and is usually from about 7 to about 12. In addition to the 12-hydroxystearic acid, such surfactants may contain a lower level of stearic acid. Also, some of the hydroxy end groups of such poly(12 hydroxystearic acid) surfactants may be capped with regular stearic acid which has no 12-hydroxy group. A specific example of a suitable poly(12-HSA) surfactant is Hypermer® LP-1 from ICI which has a degree of polymerization (n) of about 9.

2. Derivatives of polyester surfactants wherein at least a portion of the add end groups are amidized. The polyester surfactants can be amidized with, for example, N,N-dimethyl-1,3-propanediamine to form the following end groups:

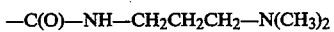

A specific example of a suitable amidized polyester is a poly(12-HSA) surfactant wherein about two-thirds of the acid end groups are amidized with N,N-dimethyl-1,3-propanediamine such as Hypermer® LP-4 available from ICI.

In another embodiment, the surfactant/dispersants are glycerides and glyceride derivatives. Examples of such nonionic surfactants include glyceride esters such as the mono-, di- or triglycerides represented by the formula

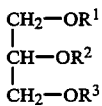

wherein $R^1$, $R^2$ and $R^3$ are independently hydrogen or acyl groups represented by the formula

wherein $R^4$ is a hydrocarbyl group of about 1 to about 30 carbon atoms, with the proviso that at least one of $R^1$, $R^2$ or $R^3$ is said acyl group. $R^4$ preferably has about 3 to about 30 carbon atoms, more preferably about 8 to about 30 carbon atoms, more preferably about 8 to about 26 carbon atoms, more preferably about 12 to about 20 carbon atoms. $R^4$ is preferably a straight chain hydrocarbon that can be saturated or unsaturated. The unsaturated groups can contain one or more double bonds. Representative

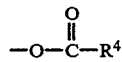

moieties are listed in Table A below:

Many of these glyceride esters occur naturally in animal and vegetable fats and oils. Examples of such fats and oils include corn oil, coconut oil, soybean oil, sunflower oil, cottonseed oil, palm oil, tallow, bacon grease, butter, castor oil, tall oil and rosin. The natural oils may be used as such, or the hydrogenated, sulfated or sulfonated forms may be used. One useful derivative is obtained by reacting a natural oil such as corn oil with an unsaturated acid or anhydride such as maleic anhydride. Particular examples of useful glycerides include glycerol monodicaprylate, glycerol dicaprylate, glycerol myristate, glycerol 1,3-distearate, glycerol monolaurate, glycerol monooleate, glycerol monoricinoleate, glycerol monostearate, glycerol tributyrate, glycerol tripropionate, glycerol tristearate, glyceryl trioleate, glyceryl tripalmitate, glyceryl triricinoleate, and mixtures thereof.

Useful glyceride derivates are available commercially from Pflaumer Brothers Inc., Norristown, Pa. under trade designations such as Tallicin Dispersant K-2 and Ester 253. Other glyceride-based dispersants are available from: Huls America Inc. under such trade designations as IMWITOR 440 identified as mono/diglyceride of natural oils, IMWITOR 742 identified as glycerol mono/diester of medium chain fatty acids. IMWITOR 908 identified as glyceryl mono/dicaprylate, etc., from Eastman Chemical Co. under the trade designations as MYVEROL SMG VK (succinylated distilled monoglycerides from hydrogenated palm oil or palm stearin); MYVATEX 3-50 K (blend of vegetabled-fat-derived distilled monoglycerides and distilled propylene glycol monostearate); etc.

(A-4) Viscosity Modifying Organic Diluent

In addition to the above components, the abrasive compositions (A) may also contain at least one viscosity modifying organic diluent. As used in conjunction with the organic diluent (A-4), the term "viscosity modifying" does not necessarily refer to any particular viscosity range, but is intended to define a material which is capable of modifying the viscosity of the abrasive composition (A). Generally, the organic diluent is a material which has a viscosity which is lower than the more viscous rosin-based component (A-2). The viscosity of the organic diluent is generally below about ten poise at 25° C. The organic diluent should be capable of modifying the viscosity of the abrasive mixture without deleteriously affecting the other desirable properties. In addition, suitable organic diluents are preferably inert to the other components, and have low color, odor, and reactivity at molding or extrusion temperatures.

The amount of viscosity modifying organic diluent (A-4) included in the abrasive compositions of the present invention may vary over a wide range, and thus, amounts of from about 0.1% to about 20%-25% by weight may be utilized. In one embodiment, the abrasive compositions of the present invention contain from

TABLE A

| Number of Carbons | Number of Double Bonds | Common Name | Systematic Name | Formula |
| --- | --- | --- | --- | --- |
| 12 | 0 | Lauryl | n-Dodecanoate | $CH_3(CH_2)_{10}COO^-$ |
| 14 | 0 | Myristyl | n-Tetradecanoate | $CH_3(CH_2)_{12}COO^-$ |
| 16 | 0 | Palmityl | n-Hexadecanoate | $CH_3(CH_2)_{14}COO^-$ |
| 18 | 0 | Stearyl | n-Octadecanoate | $CH_3(CH_2)_{16}COO^-$ |
| 20 | 0 | Arachidyl | n-Eicosanoate | $CH_3(CH_2)_{18}COO^-$ |
| 16 | 1 | Palmitoleyl | cis-$\Delta^9$-Hexadecenoate | $CH_3(CH_2)_5CH=CH(CH_2)_7COO^-$ |
| 18 | 1 | Oleyl | cis-$\Delta^9$-Octadecenoate | $CH_3(CH_2)_7CH=CH(CH_2)_7COO^-$ | about 0.1% to about 10% by weight of the organic diluent based upon the total weight of the abrasive composition.

The organic diluents generally are hydrocarbon liquids which may be natural or synthetic hydrocarbons. The hydrocarbons may be aromatic or aliphatic liquids, or mixtures of aliphatic and aromatic liquids. Specific examples of useful hydrocarbon diluents include mineral spirits, naphtha, mineral oils, hydrocarbon oils, xylene, toluene, and commercial mixtures of hydrocarbon solvents such as petroleum hydrocarbons. Oxygenated hydrocarbons such as alcohols, ketones, ethers and esters may also be used. Synthetic low molecular weight liquid polymers such as polyolefins and polyesters may also be used as the organic diluent in some applications.

Examples of specific organic diluents include: mineral oils, such as White Oil 7-NF (Technical Products, Inc., Chicago); mineral spirits such as Odorless Mineral Spirits (Chem Central); and low molecular weight (below about 1,000) polybutenes, such as Indopol L-14 (Amoco), etc.; and admixtures of one or more of such materials. Mixtures of mineral oils and mineral spirits are particularly useful.

The abrasive compositions of the present invention have a substantially uniform viscosity and are characterized by reduced thixotropy. The viscosity of the abrasive compositions is usually about 5 to about 1500 poise at 25° C. under a shear stress of 12.5 thousand dynes/cm$^2$. The abrasive compositions of the present invention often possess "length", will flow readily under gravity and can be slightly dilatant at high loadings of colorant or additive.

The terms "reduced thixotropy" and "substantially uniform viscosity", when used in conjunction with the abrasive compositions of the present invention, denote a material having a viscosity of no more than about 1500 poise at 0 shear stress and wherein said viscosity changes no more than about an order of magnitude when the shear stress is increased to about 12.5 thousand dynes/cm$^2$. For example, a material having an initial viscosity of 1500 poise and a viscosity under shear stress of about 150 poise would be considered to have a substantially uniform viscosity with reduced thixotropy.

Length is a property of a material whereby it can be stretched out into a long thread without breaking such as, for example, honey. In contrast, thixotropic materials tend to be "short", i.e., they have little or no flowing properties and tend to gel or bunch up. The abrasive compositions of the invention are preferably formulated to possess length.

When the abrasive compositions of the present invention are characterized as flowing readily under gravity it is to be understood that a 200 ml beaker filled with the liquid concentrate will deliver at least 90% of its contents within five minutes when inverted.

When the abrasive compositions of the invention are characterized as being slightly dilatant at high loadings of abrasive powder (e.g., greater than about 70% by weight of the compositions) it is to be understood that the slope of the plot viscosity (poise) vs. shear rate (sec$^{-1}$) of such materials will show an increase of up to about 600 poise as shear rate increases from about 5 to about 100 (sec$^{-1}$).

In one embodiment, the abrasive compositions of the present invention are substantially free of water. That is, the abrasive compositions (A) contain less than about 0.01% by weight of water.

Preparation of the abrasive compositions of the invention can be by any of a number of methods known in the art including those set forth in Patton, Paint Flow and Pigment Dispersion, John Wiley and Sons (1979) and Weber, Ed., Coloring of Plastics, SPE Monographs, John Wiley and Sons (1979) which are incorporated by reference herein. The preparation of the abrasive composition (A) can be accomplished by any high-speed dispenser for liquids, such as a Cowles mixer. The components of the abrasive composition can be introduced into the Cowles mixer in any desired order, and the components are mixed until a uniform dispersion is obtained. In one embodiment, the abrasive composition includes the viscosity modifying organic diluents (A-4) and the abrasive mixture is a flowable and pumpable liquid. In one embodiment, the abrasive compositions of the invention are prepared by dissolving the surfactant component (A-3) in the organic rosin material (A-2) at a temperature below about 150° C., and usually ambient temperature, in a high-speed disperser, such as a high-speed rotary mixer (e.g., Cowles Dissolver). If a diluent (A-4) is to be employed, it is usually added to the system at this point. After the surfactant is completely dissolved and the vehicle is homogeneous, the abrasive powder is gradually added under agitation and the mixture is dispersed at high-speed until a uniform, stable dispersion is achieved.

The abrasive compositions described above are useful in preparing purge compositions for cleaning plastics processing equipment. The purge compositions of the present invention are multi-component systems which provide effective purging of plastics processing equipment. The compositions of the present invention may be used in extruders as well as injection or blow molding apparatus and are specially useful when changing from one color to another. Also, dirt and contamination which is caused, for example, by burning or oxidation of chemicals, may be removed by the compositions of the present invention.

The purge compositions of the present invention comprise (A) a minor amount of the abrasive compositions described above and (B) a major amount of at least one polymer or resin. The purge composition may also contain (C) at least one blowing agent.

(B) Polymers

A wide variety of polymers and resins may be utilized in the purge compositions of the present invention, and these include thermoplastic as well as thermosetting polymers and resins. Among the thermoplastic polymers which may be utilized in the purge compositions of the present invention are polyolefins, polyesters, polyphenylene ether resins (PPO), polyamides, polyimides, polyurethanes, acrylic resins, polycarbonates, ABS resins, etc. Examples of thermosetting resins which may be utilized in the purge compositions of the present invention include allyl polymers, epoxy resins, phenolic resins, thermosetting polyesters, urea and melamine formaldehyde resins, etc.

Examples of polyolefins include, for example, polystyrenes, polyethylene, polypropylene, polybutylene, polyvinyl chloride, EVA, etc. Various forms of polyethylene can be utilized including low-density polyethylene, high-density polyethylene, ultra-high molecular weight polyethylene, etc. Nylon is an example of a useful thermoplastic polyamide. PET and PBT are examples of useful polyesters. The selection of a particular polymer for use in the purge compositions of the present invention will depend in part upon the intended use of the purge composition and, in particular, the nature of the composition within the plastics processing equipment which is to be purged, and the selection of a polymer can be readily made by one skilled in the art depending on the particular application and the user's preferences.

The purge compositions of the present invention will contain a major amount of a polymer, i.e., the purge compositions comprise more than 50% by weight of a polymer. More often, the purge composition will comprise at least 70%, 80%, or 90% by weight of a polymer.

As noted above, the purge compositions of the present invention contain a minor amount of an abrasive compositions (A) as defined above. In one embodiment, the abrasive composition (A) is present in the purge composition in amounts of up to about 15% or 20% by weight based on the weight of the purge composition. In another embodiment, the abrasive composition (A) is present in amounts of from 1% to about 15% by weight, and in yet a further embodiment, the abrasive composition is present in an amount from about 5% to about 15% by weight.

(C) Foaming Agents

The purge compositions utilized in the present invention may also contain at least one foaming agent when it is desired to form a purge composition capable of foaming during use. For example, it may be desirable to utilize a foamable purge composition to force the purge composition into remote or protected areas of the plastics processing equipment which are otherwise difficult to reach. The selection of the foaming agent to be used in any particular application will depend in part upon the type of polymer present in the purge composition. The foaming agents may be either physical or chemical foaming agents which are heat-sensitive chemicals that undergo a decomposition reaction upon heating producing both gas and solid decomposition products.

The most common types of physical foaming agents are chlorofluorocarbons, hydrocarbons, and compressed gasses, such as nitrogen and carbon dioxide. The use of these materials requires that the foaming agent be mixed with the polymer under conditions of temperature and pressure that will allow the foaming agent to stay as a liquid. Foaming is brought about by changes in temperature and/or pressure which cause the agent to vaporize.

The chemical foaming agents which may be utilized in the present invention may be either organic or inorganic foaming agents. Examples of chemical foaming agents include inorganic carbonate and bicarbonates, mixtures of polycarbonic acids and carbonates, etc.

The amount of foaming agent required to provide the desired properties can be readily determined by one skilled in the art. Generally, only small amounts of the foaming agent are required, and these amounts may range from about 0.1% to about 10% by weight based on the total weight of the purge composition.

The purge compositions of the present invention comprising the abrasive composition (A), the polymer (B) and, optionally, a blowing agent, may be prepared by mixing the components in any order although it is presently desired initially to prepare the abrasive composition (A) and thereafter incorporate the abrasive mixture into the polymer (B). The abrasive composition (A) can be blended and intimately mixed with the polymer (B) by techniques well known to those skilled in the art. For example, the abrasive composition can be blended into the polymer by mixing in a high-speed mixer. The purge compositions also can be prepared by mixing one or more polymers with the abrasive compositions in a Banbury mixer, a Brabender torque rheometer, a single or twin screw extruder, a continuous mixer, kneader, etc. The polymers can be intimately mixed in the form of granules, pellets and/or powder.

The following examples illustrate the abrasive compositions utilized in the present invention and preparation of such abrasive mixtures. Examples 1–11 illustrate the abrasive compositions of the invention and Examples A–C illustrate additional abrasive compositions which are useful in the methods of this invention. Examples 12–15 illustrate purge compositions of the present invention, and Examples D and E illustrate additional purge compositions useful in the methods of this invention for purging plastics processing equipment. Unless otherwise indicated in the following examples and elsewhere in the specification and claims, all parts and percentages are by weight, temperatures are in degrees centigrade, and pressure is at or near atmospheric pressure.

Abrasive Compositions

EXAMPLE 1

| | Percent by Weight |
|---|---|
| Calcium carbonate | 75 |
| Hercoflex 500 | 20 |
| Hypermer LP-1 | 5 |

EXAMPLE 2

| | |
|---|---|
| Calcium carbonate | 70 |
| Titanium dioxide | 5 |
| Abalyn | 20 |
| Hypermer LP-4 | 5 |

EXAMPLE 3

| | |
|---|---|
| Calcium Carbonate | 70 |
| Titanium dioxide | 5 |
| Abalyn | 20 |
| Hypermer LP-4 | 3 |
| Mineral oil | 2 |

EXAMPLE 4

| | |
|---|---|
| Marblemite TM calcium carbonate | 58.0 |
| Supermite ® calcium carbonate | 21.0 |
| Titanium dioxide (Kerr McGee CR834) | 4.0 |
| Hercoflex P100 (rosin material) | 11.2 |
| Surfactant Tallicin (Pflaumer K2) | 2.0 |
| Mineral Oil 7NF | 1.8 |
| Mineral Spirits | 2.0 |

EXAMPLE 5

| | |
|---|---|
| Marblemite TM calcium carbonate | 58.0 |

-continued

| | |
|---|---|
| Supermite ® calcium carbonate | 23.0 |
| Hercolyn D | 11.2 |
| Hypermer LP-1 | 2.0 |
| Mineral Oil | 2.0 |
| Mineral Spirits | 1.8 |

EXAMPLES 6-11

| Components | 6 | 7 | 8 | 9 | 10 | 11 |
|---|---|---|---|---|---|---|
| Marblemite | 58.0 | → | → | → | → | → |
| Supermite | 21.0 | → | → | → | → | → |
| TiO$_2$ (CR834) | 4.0 | → | → | → | → | → |
| Hercoflex 400 | 11.2 | → | → | → | → | → |
| Mineral Spirits | 2.0 | → | → | → | → | → |
| Mineral Oil | 2.8 | — | — | 0.8 | 1.8 | 2.8 |
| Hypermer LP-1 | 1.0 | — | — | — | — | — |
| Pflaumer K-2 | — | 3.8 | — | 3.0 | 2.0 | 1.0 |
| Pflaumer Ester 253 | — | — | 3.8 | — | — | — |

EXAMPLE A

| | |
|---|---|
| Titanium dioxide | 80.0 |
| Hercoflex 500 | 13.4 |
| Hypermer LP-1 | 1.3 |
| Mineral oil | 5.3 |

EXAMPLE B

| | |
|---|---|
| Titanium dioxide | 70.0 |
| Calcium carbonate | 11.0 |
| Hercoflex 500 | 12.0 |
| Hypermer LP-4 | 2.0 |
| Mineral oil | 5.0 |

EXAMPLE C

| | |
|---|---|
| Titanium dioxide | 80.0 |
| Methyl ester of rosin | 15.0 |
| Hypermer LP-4 | 2.0 |
| Mineral oil | 2.5 |
| Mineral spirits | 0.5 |

The above-described abrasive compositions can be prepared in a cylindrical tank equipped with the appropriate size Cowles-type mixing blade mounted on a motor-driven shaft with an ultimate tip speed of 4000 ft/min. The details of the mixing can be illustrated with the preparation of Example 4. The mixing vessel is charged with the Pflaumer K-2, mineral oil, Hercorex P-100 and mineral spirits, and this mixture blended. The Supermite calcium carbonate and the titanium dioxide are then added slowly with mild agitation and blended until smooth. Thereafter, the Marblemite calcium carbonate is added slowly with mild agitation. The mixture is blended under increasingly higher agitation until a smooth blend is obtained.

Purge Compositions

EXAMPLE 12

| | Percent by Weight |
|---|---|
| Polypropylene | 90 |
| Abrasive Composition of Example 5 | 10 |

EXAMPLE 13

| | |
|---|---|
| High density polyethylene (HDPE) | 95 |
| Abrasive composition of Example 5 | 5 |

EXAMPLE 14

| | |
|---|---|
| Polystyrene | 93 |
| Abrasive composition of Example 4 | 7 |

EXAMPLE 15

| | |
|---|---|
| Noryl ® (PPO blend) | 94 |
| Abrasive composition of Example 6 | 6 |

EXAMPLE D

| | |
|---|---|
| HDPE | 93 |
| Abrasive composition of Example A | 7 |

EXAMPLE E

| | |
|---|---|
| Polystyrene | 94 |
| Abrasive composition of Example B | 6 |

The purge compositions described above are useful in purging plastic processing machinery such as extruders, Banbury mixers, etc. The process is described below in an injection molding machine. However, the invention is generally applicable to other plastics processing equipment.

For example, the purge composition of Example 5 may be used to purge an injection molding machine which has been used to mold plastic parts of pigmented polymer such as pigmented polystyrene or pigmented polyethylene. The purge composition of Example 5 is introduced into the injection molding machine, and the purge composition is passed through the machine as molding is commenced. The purge composition is passed through the injection molding machine until the molded composition exiting the machine appears clean which indicates that the internal parts of the machine are clean. The purge composition is then flushed from the equipment with the next resin or color to be run.

The purge compositions of the present invention provide effective purging characteristics such that color changes may be made in the processing equipment in a faster time with less amount of purge composition required for changeover. The purge compositions of the invention are compatible with a variety of thermoplastic polymers including high-density polyethylene, low-density polyethylene, polystyrene, polyamides, etc. Furthermore, the purge compositions of the present invention are stable and can be re-used.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method of purging a material from a plastics processing equipment comprising:
   I. providing a purge composition comprising:
   (A) from about 1% to about 20% by weight of an abrasive composition comprising
   (A-1) from about 75% to about 90% by weight of a mixture of at least two abrasive powders comprising at least 50% by weight of calcium carbonate;
   (A-2) from about 5% to about 20% by weight of at least one organic rosin ester;
   (A-3) from about 0.1% to about 5% by weight of at least one surfactant; and
   (A-4) from about 0.1% to about 10% by weight of at least one viscosity modifying organic diluent; such abrasive mixture having a viscosity of about 5 to about 1500 poise at 25° C. under a shear stress of 12.5 thousand dynes/cm$^2$; and
   (B) more than 50% by weight of at least one polymer; and
   II. passing said purge composition through such plastics processing equipment until said purge composition exiting such plastics processing equipment appears clean.

2. The method of claim 1 wherein the abrasive powder in the abrasive composition comprises more than 50% by weight calcium carbonate.

3. The method of claim 1 wherein the organic rosin material (A-2) comprises an ester of an abietic acid-based rosin.

4. The method of claim 1 wherein the surfactant (A-3) comprises a poly-(hydroxy carboxylic acid).

5. The method of claim 1 wherein the equipment is an extruder.

* * * * *